United States Patent
Schenk

(10) Patent No.: US 6,257,648 B1
(45) Date of Patent: Jul. 10, 2001

(54) HARD-TOP VEHICLE

(75) Inventor: Bernhard Schenk, Boeblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/392,651

(22) Filed: Sep. 9, 1999

(30) Foreign Application Priority Data

Sep. 9, 1998 (DE) .............................................. 198 41 103

(51) Int. Cl.⁷ ...................................................... B60J 7/08
(52) U.S. Cl. .............................. 296/107.07; 296/146.14; 296/108
(58) Field of Search .............................. 296/146.14, 147, 296/107.07, 201, 108

(56) References Cited

U.S. PATENT DOCUMENTS

| | | | |
|---|---|---|---|
| 4,626,020 | * 12/1986 | Kaltz et al. | 296/147 X |
| 5,269,586 | 12/1993 | Hahn et al. | 296/224 |
| 6,123,382 | * 9/2000 | Lorenz | 296/147 X |

FOREIGN PATENT DOCUMENTS

| | | |
|---|---|---|
| 4010276 C2 | 4/1990 | (DE) . |
| 9111802 | 12/1991 | (DE) . |
| 4445944 C1 | 12/1994 | (DE) . |
| 19634511 C1 | 8/1996 | (DE) . |
| 0657607 | 6/1995 | (EP) . |
| 0850793 | 7/1998 | (EP) . |

* cited by examiner

Primary Examiner—Dennis H. Pedder
(74) Attorney, Agent, or Firm—Crowell & Moring, L.L.P.

(57) ABSTRACT

A hard-top vehicle has a front-roof part, a rear-roof part, which is provided with a fixed rear window, lateral main links for moving the front-roof part and rear-roof part, and lateral vehicle pillars which are connected to the main links. The rear window is provided with a frame so that it can be pivoted relative to the vehicle pillars. The frame is provided laterally in each case, in its top region and its bottom region, with arresting elements. For arresting purposes and for a clamping connection of the rear window to the vehicle pillars, clamping elements act on the arresting elements. The clamping elements are arranged on the vehicle pillars or on parts which are connected to the vehicle pillars. The clamping elements are provided with actuating devices arranged on the vehicle pillars or on parts which are connected to the vehicle pillars.

9 Claims, 1 Drawing Sheet

HARD-TOP VEHICLE

BACKGROUND OF THE INVENTION

This application claims the priority of 198 41 103.0-21, filed Sep. 9, 1998, the disclosure of which is expressly incorporated by reference herein.

The present invention relates to a hard-top vehicle with a front-roof part, a rear-roof part which is provided with a fixed rear window, lateral main links for moving the front-roof part and rear-roof part, and lateral vehicle pillars which are connected to the main links.

Hard-top vehicles are described, for example, in DE 44 45 944 C1 and DE 196 34 511 C1. Hard-top vehicles of a similar type are also known from DE 40 10 276 C2 and DE 91 11 802 U1.

Up until now, there have been two different methods of stowing away the roof structure in a hard-top vehicle. In a straightforward manner, pivoting about a main point of rotation is carried out such that the front-roof part and the rear-roof part with the rear window are stowed away in the rear region of the vehicle with different directions of curvature. The disadvantage with this stowing-away method, however, is that a considerable amount of the boot space is lost as a result.

In the second stowing-away method, the roof is stowed away with the same direction of curvature. Although this takes up considerably less boot space, the disadvantage, however, is that the kinematics mechanism which is necessary for this stowing-away operation involves relatively high outlay and, in part, also makes it necessary for the vehicle tail to be increased in height.

Vehicles with swing-action roofs are also beset by the, problem where the wind flowing against such roofs produces such large forces that the roof parts are raised at their separating line, this resulting in increased wind noise.

If the rear window of a vehicle is to be disengaged from the rear-roof part and provided with its own frame, then the rear window can be rotated separately from the rear-roof part and, during the stowing-away movement of the roof parts, pivoted such that it is stowed away in the same direction and/or with the same direction of curvature as the front-roof part. This means that considerably less boot space is taken up than when the roof parts are stowed away in different directions.

Such a roof structure is beset by a further problem, however, namely that the stiffness of the rear roof half or of the rear-roof part is lost since it no longer provides a fixed connection between the lateral vehicle pillars, e.g. the C-pillars, and the associated left and right kinematics mechanisms. Furthermore, in order to realize the necessary sealing pressure, the rear window must be fixedly connected to the kinematics mechanisms and/or the vehicle pillars at a number of points.

SUMMARY OF THE INVENTION

An object of the present invention is thus to provide roof stowage, for a hard-top vehicle, which, once the roof has been stowed away, requires the smallest amount of space possible and, when the roof is in the closed state, produces just a low level of wind noise as a result of corresponding sealing between the individual parts.

This object has been achieved according to the invention by providing the rear window with a frame by way of which it can be pivoted relative to the vehicle pillars. The frame is provided laterally in each case, in its top region and/or its bottom region, with arresting elements, for arresting purposes and for a clamping connection of the rear window and/or of the frame to the vehicle pillars. Clamping elements connected to the vehicle pillars act on the arresting elements. The clamping elements are arranged on the vehicle pillars or on parts which are connected to the vehicle pillars, and are provided with actuating devices arranged on the vehicle pillars or on parts which are connected to the vehicle pillars.

Because the rear window can be pivoted relative to the vehicle pillars, it can be stowed away, e.g. in the boot, in a space-saving manner in the same direction and/or with the same direction of curvature as the front-roof part. Sufficient stability is achieved by the arresting elements, which interact with the clamping elements and may be designed, for example, in a straightforward manner as bolts, and at the same time, when the roof is closed, the clamping elements achieve good sealing between the individual roof parts which can be moved in relation to one another. As a result, no excessively high level of wind noise is produced.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

The apparatus for stowing away the roof of a hard-top vehicle basically functions in a known manner, for which reason it is only those parts which are essential to the invention which are discussed in more detail hereinbelow. In particular, for reasons of clarity, the articulation kinematics mechanism for stowing away the roof is not illustrated.

Figure 1:
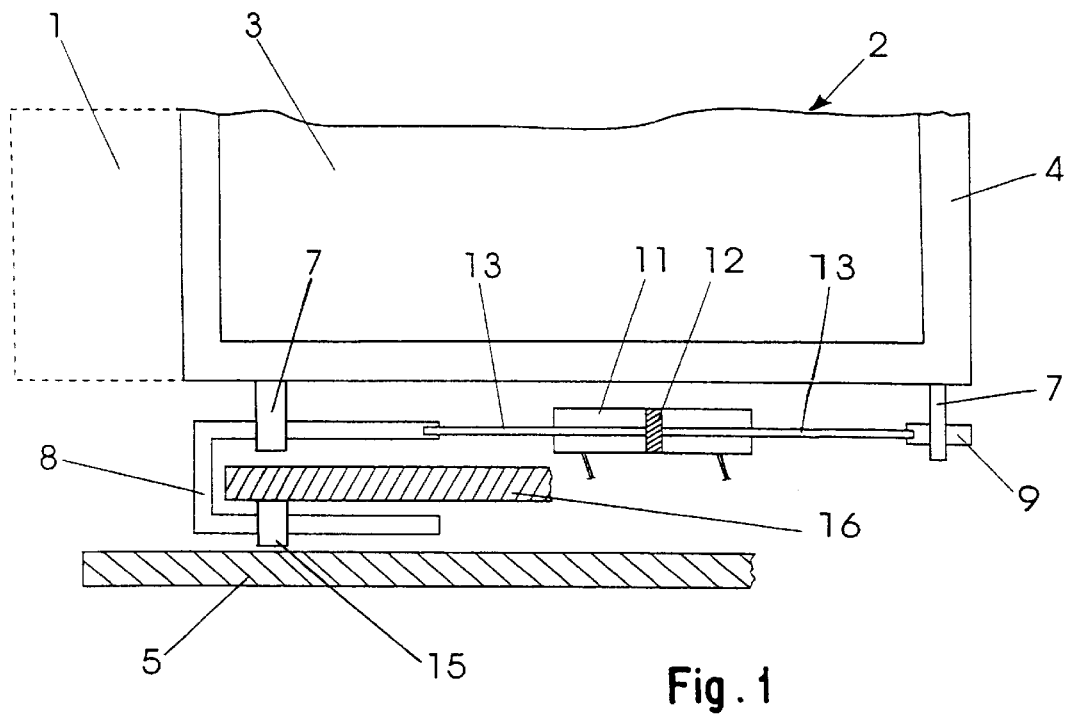
FIG. 1 is a plan view of part of the rear region of the roof structure of a hard-top vehicle.
Figure 2:
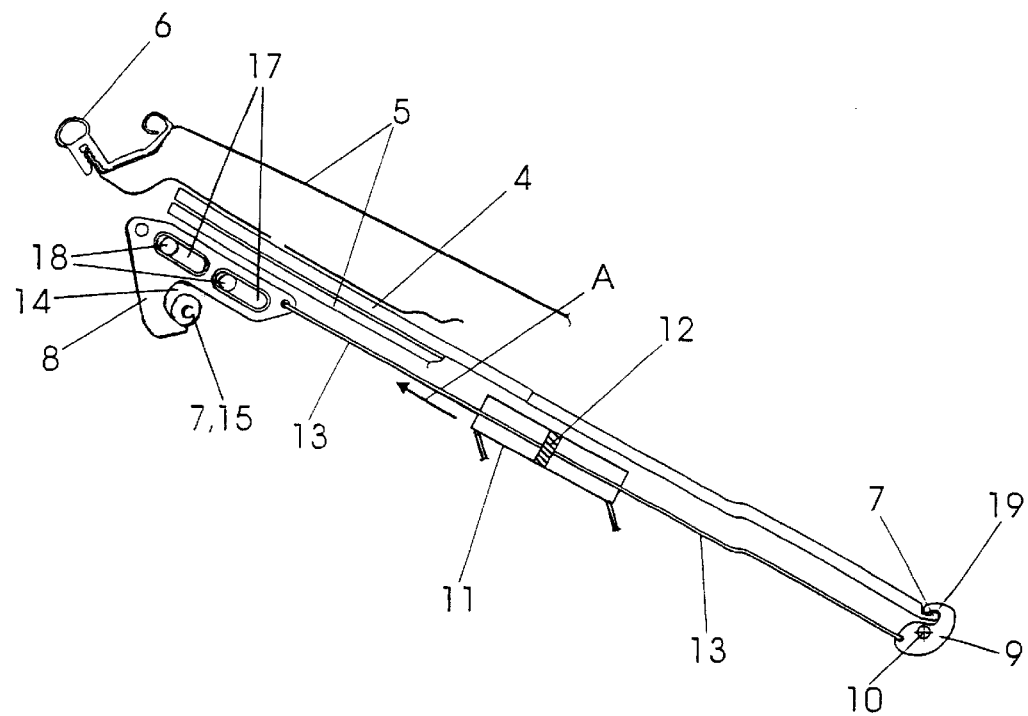
FIG. 2 is a side view of the roof structure shown in FIG. 1.

The roof structure has a front-roof part 1 (indicated by dashed lines in FIG. 1) and a rear-roof part 2 which is connected releasably to the front-roof part and has a rear window 3, with a frame 4, and lateral vehicle pillars 5. A sealing unit 6 is located between the front-roof part 1 and the rear-roof part 2. The rear window 3 can be pivoted in relation to the two lateral vehicle pillars 5 via its frame 4, in a manner which is not illustrated specifically, about an axis located transversely to the longitudinal direction of the vehicle.

On each vehicle side, the frame 4 is provided, in its top region and in its bottom region, with arresting elements in the form of pins or bolts 7. If appropriate as an alternative, arresting elements can be provided just at the top or just at the bottom.

Interacting as clamping element with the respectively top bolt 7 on each side is a double slide 8, which is in the form of a U in plan view. A rotary latch 9 acts, as clamping element, on the respectively bottom bolt 7 and is arranged rotatably on the associated vehicle pillar 5 by way of its rotary pin 10.

A hydraulic cylinder 11 with a double-acting piston 12 is arranged on the vehicle pillar 5 on each side. At its two piston ends, the double-acting piston 12 is connected, via push/pull rods 13, to the associated rotary latch 9 in the bottom region, and to the double slide 8 in the top region, by way of the free ends of the push/pull rods 13.

On the side which is directed towards the frame 4, the double slide 8 engages with the bolt 7 by way of a claw-shaped cutout 14, which is located in that leg of the U which is on the slide. For this purpose, the bolt 7 is configured as an eccentric bolt. As a result, corresponding arresting and/or clamping is established when the hydraulic cylinder 11 is actuated.

On the outside, the other leg of the U-shaped double slide 8 is likewise provided with a claw-shaped cutout, which interacts with a likewise eccentric clamping bolt 15 which is arranged on a main link 16. The front-roof part 1 and the rear-roof part 2 are stowed away in a known manner via the main link 16.

In order to stow away the two roof parts 1, the hydraulic cylinder 11, as the actuating unit, is displaced in arrow direction A by corresponding activation and/or pressure actuation by way of the piston 12. This movement is transmitted to the slide 8 and the rotary latch 9 via the push/pull rods 13. The arresting and/or the clamping of the bolts 7 is released in this way because the top bolt 7 passes out of the claw-like cutout 14 while, with the rotation of a catch 19 of the rotary latch 9 about the rotary pin 10, the respectively bottom bolt 7 is freed. As a result, the rear frame 4 is released as far as its prestressed connection to the main pillar or vehicle pillar 5 is concerned. By way of a corresponding kinematics mechanism (not illustrated), the rear window 3 can then be pivoted such that it is stowed away in the same direction as the front-roof part 1. For the purpose of guiding the double slide 8, the latter has two slots 17 which are arranged one behind the other in the sliding direction and into which guide bolts 18 project for the purpose of guiding the double slide 8.

Once the front-roof part 1 and the rear-roof part 2 have been pivoted back for renewed closure of the roof, the rear window 3 with its frame 4 being pivoted back into the closed position again at the same time. The last step is that of the piston 12 of the hydraulic cylinder 11 moving counter to the arrow direction A so that the bolts 7, 15 "latch" again, with prestressing, in the claw-like cutouts 14 of the double slide 8 and in the catch 19 of the rotary latch 9.

During the closing movement of the hydraulic cylinder 11, the rear window 3 is locked, both in the bottom region and in the top region, to the vehicle pillar 5, as is the main link 16 to the vehicle pillar 5 via the bolt 15.

Instead of the hydraulic cylinder 11 as the actuating device, other devices can be used for actuating the double slide 8 and the rotary latch 9, e.g. an electric motor. Likewise, the clamping elements with the two lateral rotary latches 9 in the rear or bottom region and the rotary slides 8 in the top region can be arranged the other way round or reversed.

If the actuating device is configured with a hydraulic cylinder 11 in the manner specified and with the double-acting piston 12, only one actuating device in each case is advantageously required on each side, as a result of which the amount of installation space and the number of components are reduced correspondingly.

In the closed state, on account of the stressed bolts 7 in the slide 8 and the rotary latches 9, the sealing unit 6 abuts with a corresponding contact-pressure force, with the result that wind noise is avoided. Depending on the installation conditions and on the structure selected, it is also possible, if appropriate, for the respectively top slide 8 to be replaced by a clamping element which, in the same way as the bottom rotary latches 9, executes a rotary movement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hard-top vehicle having a front-roof part, a rear-roof part provided with a fixed rear window, lateral main links configured to move the front-roof part and the rear-roof part, and lateral vehicle pillars, wherein the rear window comprises a frame pivotable relative to the vehicle pillars, and arranged laterally, in at least one of a top region and a bottom region thereof, with arresting elements configured to arrest and provide a clamping connection of at least one of the rear window and the frame to the vehicle pillars, and clamping elements operatively connected to said vehicle pillars to act on the arresting elements, the clamping elements comprising actuating elements and being operatively arranged on one of the vehicle pillars and parts which are connected to the vehicle pillars, wherein the arresting elements comprise bolts, and, on each side the clamping elements comprise a rotary latch arranged to act on one of the bolts and a slide arranged to act on another of the bolts.

2. The hard-top vehicle according to claim 1, wherein the actuating element is arranged between the rotary latch and the slide and is operatively connected to the rotary latch and the slide via a push/pull rod.

3. The hard-top vehicle according to claim 2, wherein the actuating element comprises a double-acting piston on which each push/pull rod is arranged to act.

4. The hard-top vehicle according to claim 1, wherein the slide is configured as a double slide to act both on the bolt of the frame of the rear window and on a clamping bolt fastened on each of the main links.

5. The hard-top vehicle according to claim 4, wherein the actuating element is arranged between the rotary latch and the slide and is operatively connected to the rotary latch and the slide via a push/pull rod.

6. The hard-top vehicle according to claim 5, wherein the actuating element comprises a double-acting piston on which each push/pull rod is arranged to act.

7. The hard-top vehicle according to claim 4, wherein the double slide has a substantially U-shape form with the bolt of the frame acting on one leg of the U-shape form and the bolt of the main link acting on the other leg of the U-shape form, and the two bolts being eccentric bolts.

8. The hard-top vehicle according to claim 4, wherein the double slide is guided in slots.

9. The hard-top vehicle according to claim 8, wherein the double slide has a substantially U-shape form with the bolt of the frame acting on one leg of the U-shape form and the bolt of the main link acting on the other leg of the U-shape form, and the two bolts being eccentric bolts.

* * * * *